(12) United States Patent
Rolfes et al.

(10) Patent No.: US 7,408,501 B2
(45) Date of Patent: Aug. 5, 2008

(54) METHOD EMPLOYING THE RADAR PRINCIPLE FOR MEASURING THE FILL LEVEL OF A MEDIUM IN A CONTAINER

(75) Inventors: Ilona Rolfes, Bochum (DE); Thomas Musch, Mulheim/Ruhr (DE)

(73) Assignee: Krohne S.A., Romans-Cedex (FR)

( * ) Notice: Subject to any disclaimer, the term of this patent is extended or adjusted under 35 U.S.C. 154(b) by 341 days.

(21) Appl. No.: 11/194,947

(22) Filed: Aug. 2, 2005

(65) Prior Publication Data
US 2006/0201246 A1 Sep. 14, 2006

(30) Foreign Application Priority Data
Mar. 11, 2005 (DE) .................. 10 2005 011 686

(51) Int. Cl.
*G01S 13/08* (2006.01)
*G01F 23/28* (2006.01)

(52) U.S. Cl. ............... 342/124; 73/290 V; 73/1.73; 340/612

(58) Field of Classification Search .......... 73/1.82, 73/627, 620, 579, 1.73, 290 V; 342/124
See application file for complete search history.

(56) References Cited

U.S. PATENT DOCUMENTS

| | | | | |
|---|---|---|---|---|
| 5,337,289 A | * | 8/1994 | Fasching et al. | 367/140 |
| 5,438,867 A | * | 8/1995 | van der Pol | 73/290 V |
| 5,614,831 A | * | 3/1997 | Edvardsson | 324/642 |
| 5,734,346 A | * | 3/1998 | Richardson et al. | 342/124 |
| 5,827,943 A | * | 10/1998 | Schmidt | 73/1.73 |
| 6,253,615 B1 | * | 7/2001 | Simmonds et al. | 73/579 |
| 6,634,234 B1 | * | 10/2003 | Haas | 73/618 |
| 6,795,015 B2 | * | 9/2004 | Edvardsson | 342/124 |
| 6,829,932 B2 | * | 12/2004 | Laun et al. | 73/290 V |
| 2002/0059828 A1 | | 5/2002 | Muller et al. | |
| 2003/0010116 A1 | * | 1/2003 | Cavazzin et al. | 73/290 V |
| 2004/0031335 A1 | | 2/2004 | Fromme et al. | |
| 2004/0079150 A1 | * | 4/2004 | Breed et al. | 73/291 |
| 2004/0119636 A1 | * | 6/2004 | Edvardsson et al. | 342/124 |
| 2005/0179584 A1 | * | 8/2005 | Ohlsson | 342/124 |
| 2006/0044145 A1 | * | 3/2006 | Akerstrom et al. | 340/612 |
| 2006/0169040 A1 | * | 8/2006 | Spanke | 73/290 V |
| 2006/0201246 A1 | * | 9/2006 | Rolfes et al. | 73/290 V |
| 2007/0012113 A1 | * | 1/2007 | Ulmer | 73/618 |
| 2007/0101809 A1 | * | 5/2007 | Roesner | 73/290 R |
| 2007/0101810 A1 | * | 5/2007 | Eriksson et al. | 73/290 V |

FOREIGN PATENT DOCUMENTS

| | | |
|---|---|---|
| DE | 10149851 A1 | 4/2003 |
| WO | WO 0160718 A2 | 9/2001 |
| WO | WO 2005078475 A1 | 8/2005 |

* cited by examiner

*Primary Examiner*—Hezron E. Williams
*Assistant Examiner*—Gunnar J Gissel
(74) *Attorney, Agent, or Firm*—Cesari and McKenna, LLP

(57) ABSTRACT

A method for measuring the fill level of a medium in a container by applying the radar principle, whereby a measuring signal is generated and transmitted in the direction of the medium. A retroreflected portion of the measuring signal is captured and the fill level is determined as a function of the runtime of the measuring signal. The measuring signal is transmitted into multiple mutually different regions and the retroreflected portions of the measuring signal is received at multiple receiving points. In this fashion, it is possible to at least approximate the surface structure of the medium in the container.

7 Claims, 3 Drawing Sheets

METHOD EMPLOYING THE RADAR PRINCIPLE FOR MEASURING THE FILL LEVEL OF A MEDIUM IN A CONTAINER

This invention relates to a method for measuring the level of a medium in a container by employing the radar principle, whereby a measuring signal is generated and sent in the direction of the medium, a retroreflected part of the measuring signal is captured, and the fill level is determined as a function of the runtime of the measuring signal.

BACKGROUND OF THE INVENTION

Level measuring methods of the type referred to above have been well-known from prior art, for instance as described in WO 01/11323 A1. Industrial applications often call for the determination of the level of a medium or substance such as a liquid or bulk material in a container, for instance a tank. A variety of techniques have been employed, differentiated between contact level measuring methods and non-contact level measuring methods. The contact level measuring methods in which a component of the measuring device touches the medium whose level is to be measured, include level determination by means of a float, a buoyant element or a sensor plate. Known contact level measuring methods further include capacitive measurements whereby the fill level is determined as a function of the capacitance between an electrode immersed in the medium and the wall of the container, as well as thermal measurements whereby the increased heat dissipation upon the immersion of a current-carrying, temperature-dependent resistance element in the medium is used as a measure of the electrical resistance that varies with and is indicative of the depth of immersion.

The non-contact level measuring methods include, for instance, measurements using a laser or ultrasound. A laser beam or ultrasonic signal is directed at and reflected back by the surface of the medium and the reflected signal is captured, with the runtime of the signal indicating the fill level of the medium. The same basic principle is employed in radar level measuring methods in which a microwave signal is generated and sent, via an antenna such as a rod antenna, a horn antenna or a patch antenna, in the direction of the medium whose level is to be determined and off whose surface it is retroreflected and recaptured by the same or some other antenna.

There exist several different radar level measuring methods. In the pulsed radar level measuring method, a microwave signal is transmitted in the form of short pulses, either unmodulated or carrier-frequency-modulated. The runtime of the microwave pulses from the transmitter to the surface of the medium and back to the receiver permits the determination of the distance between the transceiver and the medium, in which case one antenna can serve as the transmitter and the receiver. In the frequency modulated continuous-wave (FMCW) level measuring method, the microwave signal is emitted in continuous fashion but its frequency is modulated, typically by consecutive ramping. As a result of the delay during the signal propagation, the transmitter frequency us will have changed by the time the reflected signal is received back, with the frequency difference being indicative of the distance of the reflecting surface and thus of the fill level. And finally, there is the time domain reflectometry (TDR) level measuring method that is somewhat similar to the pulsed radar level measuring method but usually works via a conductor and employs electrical pulses without a carrier frequency.

A problem is encountered at times in that especially in the determination of the fill level of bulk material, the runtime of the retroreflected portion of the measuring signal does not provide a direct measure of that fill level. This is because, typically, the surface of bulk material does not form a plane but rather a cone that does not define a specific level. Moreover, the transmitted measuring signal may not even be reflected back by the medium in the container but by some device in the container such as an agitator or stirrer.

The document cited above, WO 01/11323 A1, describes a system that works at very high frequencies of several GHz, typically even more than 24 GHz. That results in an extremely narrow transmission lobe of the transmitter antenna, allowing the measuring signal to be transmitted in a specifically defined, narrow spatial direction. This also makes it possible to prevent the signal from impinging on a device in the container such as a stirrer. In fact, the point at which the transmitted measuring signal impinges on the medium in the container can be precisely selected. Nevertheless, determining the level of bulk material remains difficult due to the surface cone.

SUMMARY OF THE INVENTION

It is therefore the objective of this invention to present a method for measuring the level of a medium in a container by means of which it is possible to obtain reliable level determinations even under complex conditions such as the presence of built-in devices in the container or of bulk materials with a dome-shaped, conical surface.

Referring to the above-described method, this objective is achieved by transmitting the measuring signal into multiple, mutually different regions and collecting the retroreflected portions of the measuring signal via multiple receiving points.

The substance of the invention thus consists in the fact that the measuring signal is transmitted, simultaneously or sequentially, in such fashion that it "covers" different surface regions of the medium in the container and that the retroreflected portions of the measuring signal are received not only at one collecting point i.e. one position on the receiving antenna but at several receiving points. A preferred embodiment of the invention further provides for at least two receiving points to determine the respective amplitude and phase of the retroreflected portion of the measuring signal, with such amplitude and phase data serving to approximate, on the basis of a geometric model for the surface contour of the medium in the container, the actual surface structure of the medium.

In other words, the amplitude and phase data obtained at different receiving points are applied to a geometric-mathematical model for the topology of the surface contour of the medium in order to determine specific parameters such as the height, slope etc. for a generally assumed surface form. For example, the assumption can be made that the surface contour follows a simple geometric structure such as a cone, permitting the determination of such characteristic parameters as the height of the cone and its slope. Due to the radar resolution in the direction of propagation and to the "coverage" of a specific region, the model yields a resolution segment which ultimately provides parameters within the model that are indicative of the surface structure of the medium in the container. By approximation, essentially through regional scanning, this produces information on the three-dimensional surface topology of the medium, permitting, for instance in the case of bulk materials, an assessment of the size, shape and structure of a surface cone. According to a preferred conceptual version of the invention, it is further possible on the basis of the approximated surface structure of the medium to calculate its volume and thus to obtain information on the quantity of the medium in the container.

In a preferred embodiment of the invention, the measuring signal employed is an FMCW signal. The FMCW principle lends itself particularly well to the generation of phase and amplitude information which, by applying the above-mentioned model, provides in simple fashion an indication of the specific parameters of an assumed surface structure.

A level meter for use in conjunction with the above method may be configured in different ways. For example, a preferred implementation of the invention may utilize separate transmitting and receiving antennas, in which case the receiving antenna, and preferably the transmitting antenna as well, can be moved in at least two mutually different locations for transmitting a measuring signal from the location concerned and, respectively, for receiving a retroreflected portion of the measuring signal. As part of the subsequent signal processing, the retroreflected portions of the measuring signal are then superposed in order to permit an evaluation as described above.

As an alternative, another preferred embodiment of the method according to the invention provides for the use of multiple receiving antennas and preferably multiple transmitting antennas as well. Specifically, an array of multiple, fixed transmitting antennas and an array of multiple, fixed receiving antennas are employed, in which case, in consecutive fashion, one transmitting antenna and one receiving antenna are simultaneously activated a pair at a time, thus cycling through several and preferably all transmitting and receiving antenna pairings. In other words, in each case one transmitting antenna and one receiving antenna are activated simultaneously, whereby, with at least a partial time overlap, a measuring signal can be transmitted and, respectively, retroreflected portions thereof can be received.

In one preferred embodiment of the invention, a particularly suitable configuration employs an array of patch antennas that may encompass separate receiving and transmitting antennas, although it is also possible in the case of a reciprocal i.e. staggered arrangement of the antennas, to use the individual antennas as dual-purpose transmitting and receiving antennas.

There are numerous ways in which the method according to the invention can be configured and further enhanced. In this context, attention is invited to the dependent claims and to the following detailed description of preferred invention embodiments with reference to the drawings.

DETAILED DESCRIPTION OF AN ILLUSTRATIVE EMBODIMENT

Figure 1:
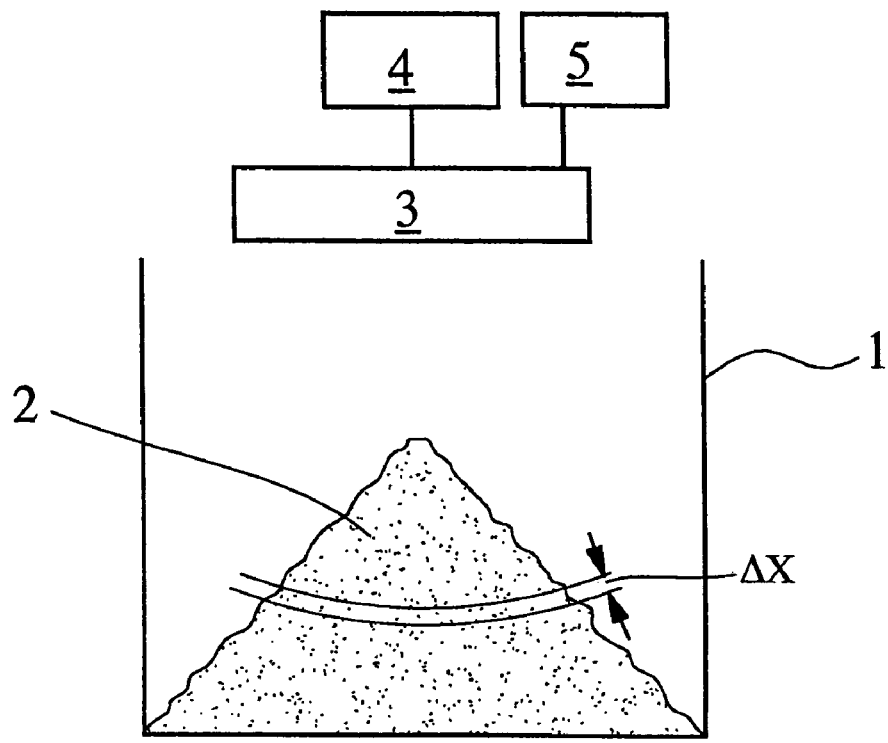
FIG. 1 is a schematic illustration of a level meter designed to apply the level measuring method according to one preferred embodiment of the invention.

FIG. 1 is a schematic illustration of a level meter designed to use a level measuring method according to one preferred embodiment of the invention. Located above a container 1 holding a medium 2, in this case bulk material, is an antenna system 3 which receives a measuring signal from a signal generator 4 and which, for the further processing of the captured retroreflected portions of the measuring signal, connects to a signal processing device 5.

Figure 2:
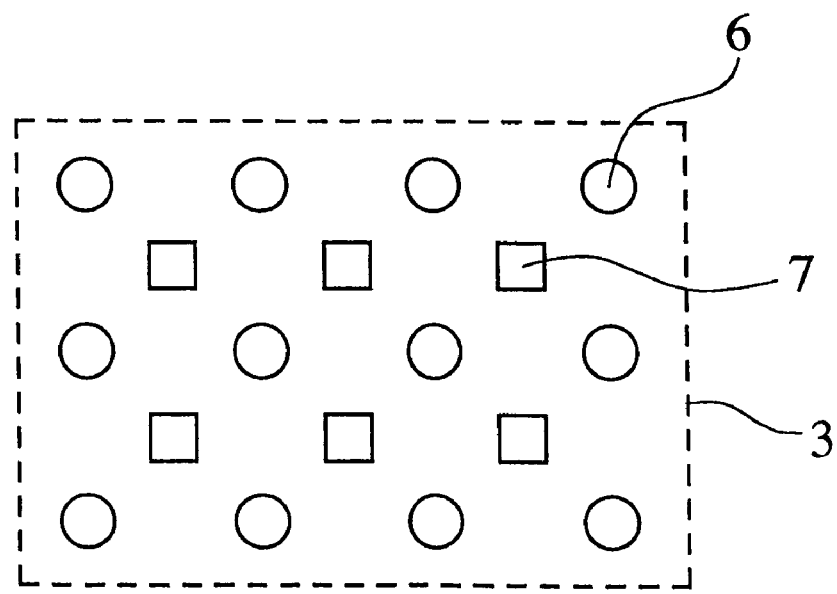
FIG. 2 shows the arrangement of transmitting and receiving antennas according to a preferred embodiment of the invention.
Figure 3:
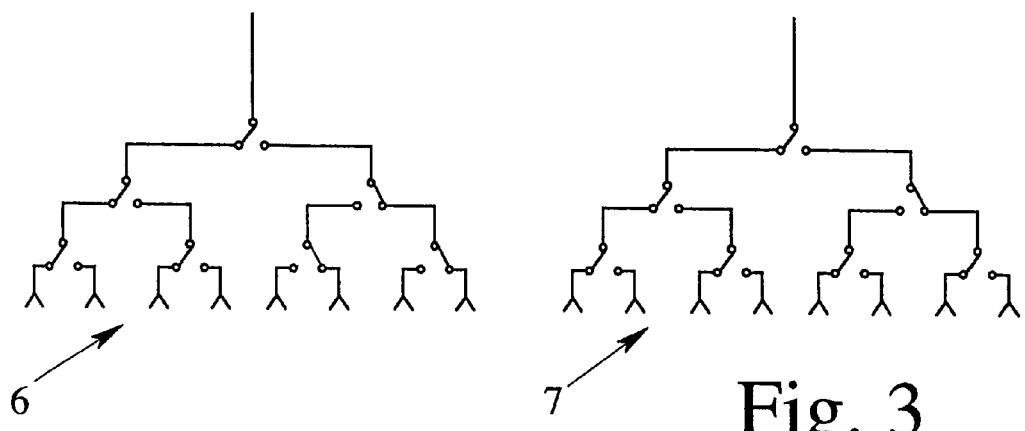
FIG. 3 shows the switching circuitry of the transmitting and, respectively, receiving antennas according to a preferred embodiment of the invention.

In the preferred embodiment of the invention, as shown in FIG. 2, the antenna system 3 features an alternating array of transmitting antennas 6 and receiving antennas 7 extending in one plane. FIG. 3 shows how in a preferred embodiment the transmitting antennas 6 and receiving antennas 7 may be connected in a manner whereby one transmitting antenna 6 and one receiving antenna 7 can be "activated" at a time. As a result, it is possible to sequentially activate all pairings of a transmitting antenna 6 and a receiving antenna 7 and to subsequently subject the signal received by the respective receiving antenna 7, i.e. the retroreflected portion of the measuring signal sent by the respective transmitting antenna 6, to further processing in the signal processing device 5.

Figure 5:
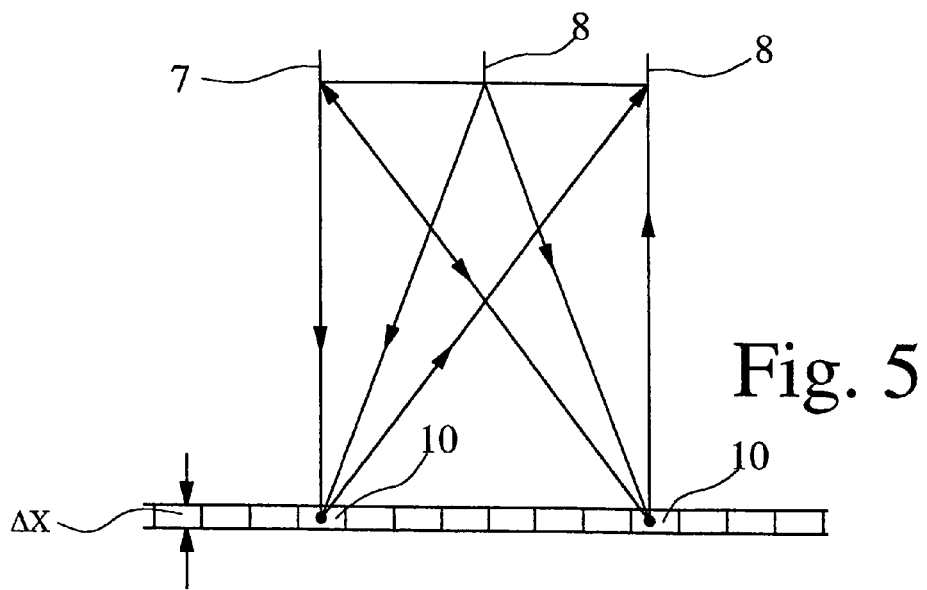
FIG. 5 is a diagrammatic illustration of the composition of a signal received by a receiving antenna according to a preferred embodiment of the invention.

The signal processing device 5 then determines the amplitude and phase of the retroreflected portion of the measuring signal for a given pairing of transmitting antenna 6 and receiving antenna 7. As has been indicated further above, the amplitude and phase information collected at different receiving points can be used, with the aid of a geometric-mathematical model, for establishing the surface topology of the medium 2 and thus for determining the parameters for an assumed surface contour. Due to the radar resolution $\Delta x$ in the direction of propagation and to the "coverage" of specific regions, the model used will provide resolution cells 10 for instance as shown in FIG. 5 by way of which it is then possible to determine the parameters for the surface structure of the medium 2 in the container 1. By approximation, this will yield the desired information on the surface topology of the medium 2, permitting an assessment of the size, shape and nature of the surface cone of the medium 2.

Figure 4:
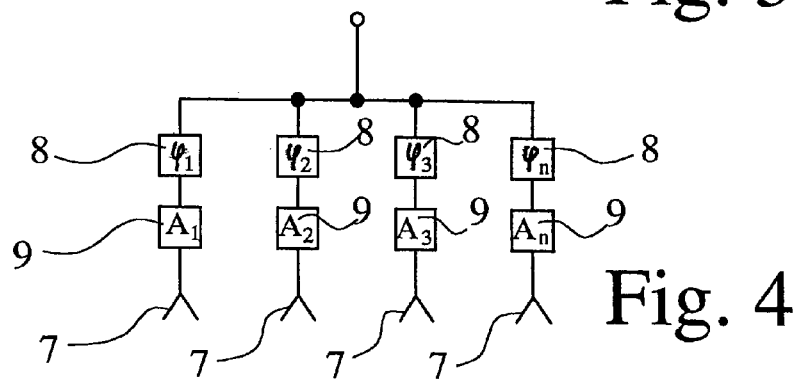
FIG. 4 illustrates the switching circuitry of receiving antennas in another preferred embodiment of the invention.

FIG. 4 shows that, instead of overlaying the signals received by the individual receiving antennas 7 in the signal processing device 5, the signals received can also be overlaid in analogous fashion by directly connecting permanent phase switches 8 and amplitude switches 9 in series with the receiving antennas 7. However, this is relatively complex and a "software solution" is to be preferred.

Figure 6:
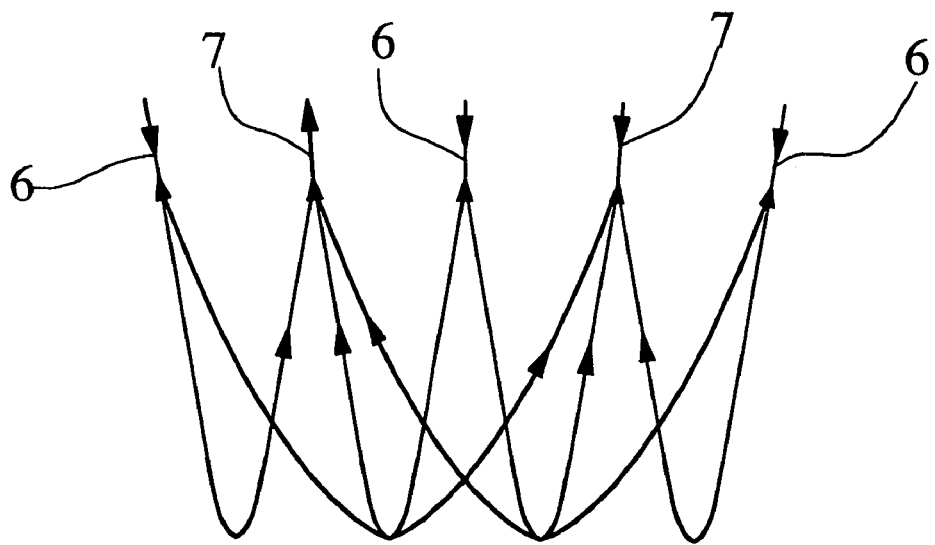
FIG. 6 shows the possible pairings of transmitting and receiving antennas according to one preferred embodiment of the invention.
Figure 7:
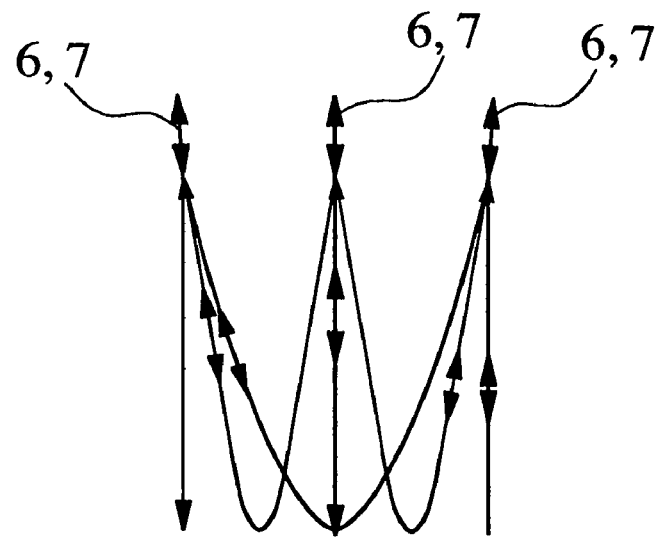
FIG. 7 depicts the combinations that are possible when the antennas double as transmitting and receiving antennas.

Every resolution cell 10 captured via a combination of a transmitting antenna 6 and a receiving antenna 8 essentially provides a reference point which, by means of an approximation or interpolation process, suggests the parameters by way of which, in an assumed surface-structure contour of the medium 2 in the container 1, the actual, specific nature of the latter can be derived. The more transmitting antennas 6 and receiving antennas 7 are employed, the greater the number of resolution cells 10 which essentially serve as reference points for the approximation of the surface structure of the medium 2. If, as shown in FIG. 6, antennas are used that can function as transmitting antennas 6 or receiving antennas 7, a number n of transmitting antennas 6 and m receiving antennas 7 will result in n×m resolution cells 10 for determining the surface structure of the medium 2. But if the antennas can be used as both transmitting antennas 6 and receiving antennas 7 in the way illustrated in FIG. 7, a total number of n transmitting/receiving antennas 6, 7 will produce n+n (−1)/2 resolution cells 10.

What is claimed is:

1. A method for measuring the fill level of a medium in a container by employing the radar principle, whereby a measuring signal is generated and transmitted in the direction of the medium, a retroreflected portion of the measuring signal is captured, and as a function of the runtime of the measuring signal the fill level is determined, the method comprising the steps of transmitting the measuring signal into multiple, mutually different regions, and receiving the retroreflected portions of the measuring signal at multiple, mutually different receiving points wherein for at least two receiving points, determining the respective amplitude and phase of the retroreflected portion of the measuring signal, and approximating the surface structure of the medium by applying this amplitude and phase information to a geometric model for the surface contour of the medium in the container.

2. A method for measuring the fill level of a medium in a container by employing the radar principle, whereby a measuring signal is generated and transmitted in the direction of the medium, a retroreflected portion of the measuring signal is captured, and as a function of the runtime of the measuring signal the fill level is determined, the method comprising the steps of transmitting the measuring signal into multiple, mutually different regions, and receiving the retroreflected portions of the measuring signal at multiple, mutually different receiving points including the step of providing a transmitting antenna and a receiving antenna, of which the receiving antenna and preferably the transmitting antenna as well are moved to at least two mutually different locations for transmitting a measuring signal from the respective location and receiving a retroreflected portion of the measuring signal.

3. The method as in claim 1 or 2, wherein the approximated surface contour of the medium is used to calculate the volume of the latter.

4. The method as in claim 1 or 2, wherein the measuring signal employed is an FMCW signal.

5. The method as in one of the claims claim 1 or 2, wherein the signal is transmitted by multiple transmitting antennas and the signal portions are received by multiple receiving antennas.

6. The method as in claim 5, including the steps of providing multiple fixed transmitting antennas and multiple fixed receiving antennas, and simultaneously activating in successive fashion one transmitting antenna and one receiving antenna, whereby several and preferably all pairings of a transmitting antenna and a receiving antenna are utilized.

7. The method as in claim 5, wherein said antennas comprise an array of patch antennas.

\* \* \* \* \*